United States Patent
Föhl

[11] 3,976,257
[45] Aug. 24, 1976

[54] SAFETY BELT PULL-IN DEVICE

[76] Inventor: Artur Föhl, Schelmenwasenstr. 68, 7061 Haubersbronn, Germany

[22] Filed: Jan. 2, 1975

[21] Appl. No.: 537,963

[30] Foreign Application Priority Data
Jan. 3, 1974  Germany............. 2400141

[52] U.S. Cl.................. 242/55; 242/107
[51] Int. Cl.².................. B65H 75/02
[58] Field of Search.......... 242/55, 107 R; 200/61.58 B, 61.58 R; 280/150 SB; 297/385, 388

[56] References Cited
UNITED STATES PATENTS

| | | | |
|---|---|---|---|
| 1,888,623 | 11/1932 | Daine | 242/55 X |
| 2,977,059 | 3/1961 | Mero | 242/55 |
| 3,182,923 | 5/1965 | Botar | 242/55 |
| 3,368,768 | 2/1968 | Harris | 242/55 |

Primary Examiner—Edward J. McCarthy
Attorney, Agent, or Firm—Walter Becker

[57] ABSTRACT

A safety belt pull-in device comprising a reel having one end of a first safety belt section connected thereto, whereas the other end of the first safety belt section is connectable to a second or stationary belt section. The first belt section, which when not in use, is wound upon the reel, is operatively connected to a motor such as a fluid-operable motor or an electric motor which so controls the reel that when the first safety belt section is being unwound from the reel by pulling the safety belt, is being pulled off the reel at at least nearly even pull.

15 Claims, 13 Drawing Figures

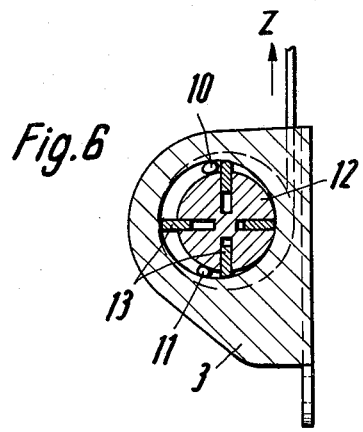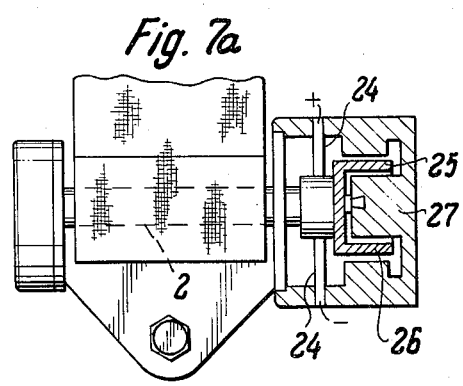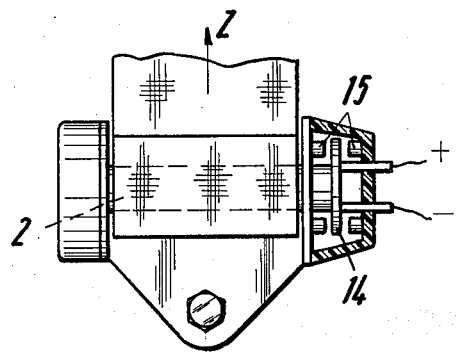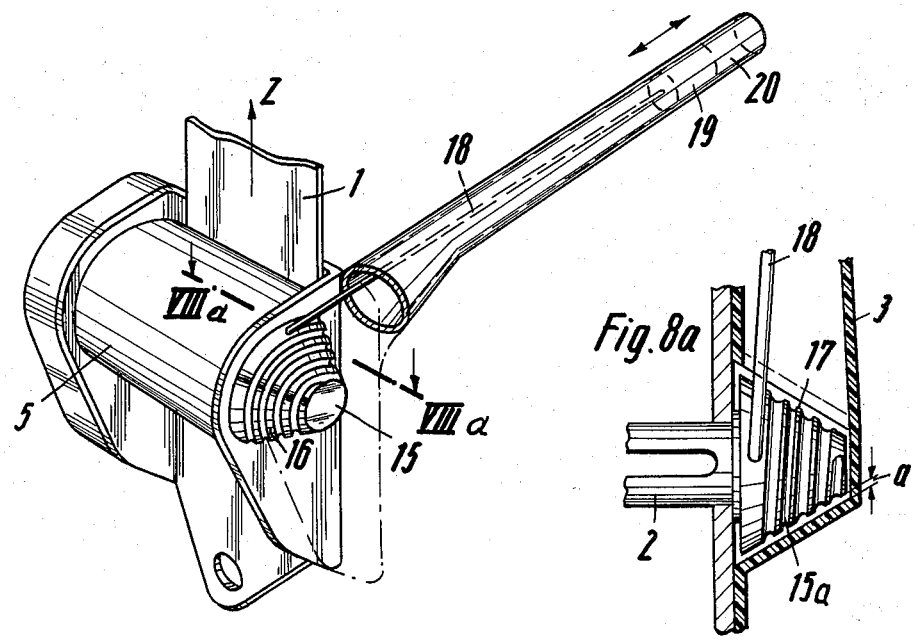

SAFETY BELT PULL-IN DEVICE

The present invention relates to a device for drawing in the safety belt which comprises a reel shaft connected to one of the belt or cable ends and arranged in a housing serving as base frame, said belt or cable being stored on said reel shaft.

With heretofore known devices for drawing in the safety belt, the return pull torque required for winding up the belt is generated by a correspondingly preloaded spiral-shaped return spring which is connected with one end to a housing and with the other end to the reel shaft. With this embodiment, the necessary force for pulling out the belt increases greatly due to the continuous increase in the force of the return spring, while simultaneously the belt coil decreases and the effective lever arm automatically decreases.

This fact frequently brings about in practice that the owner of safety belt pull-in devices do not use the same because they find the great pressure increase uncomfortable, for instance, during a forward movement in applying condition.

Therefore, industry has endeavored to make the pre-load of the return spring very low in order not to require still greater belt pull forces. This, however, brings about the drawback that the low starting moment will not fully bring back the belt to its starting position.

It is, therefore, an object of the present invention to provide a pulling device for a safety belt, which device will overcome the above mentioned drawbacks and will bring about that the belt can be pulled out while requiring a low increase in force and will permit the pull out of the belt at constant force.

These and other objects and advantages of the invention will appear more clearly from the following specification, in connection with the accompanying drawings, in which.

Figure 3:
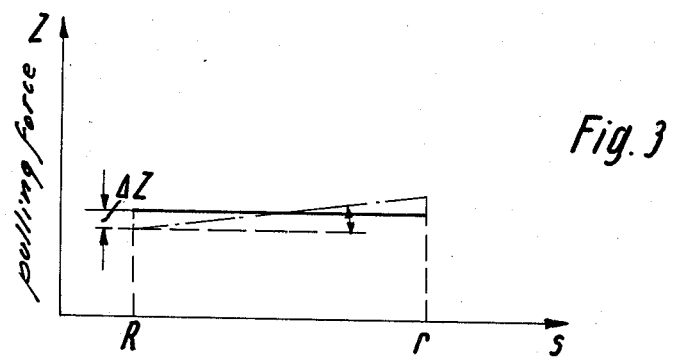

FIG. 3 diagrammatically shows the course of the belt withdrawing force over the winding radius according to a still further embodiment of the invention, according to which the pulling out force for the belt is constant over the entire winding region.

Figure 4:
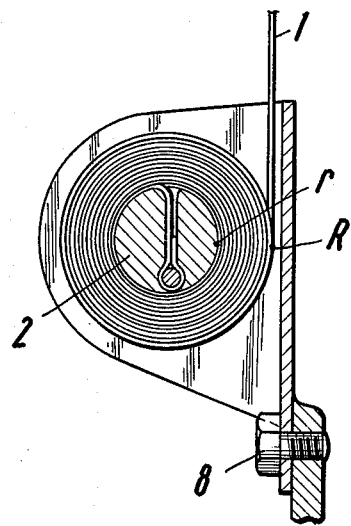

FIG. 4 shows a section through a reel or winding coil of an embodiment according to the invention.

Figure 5:
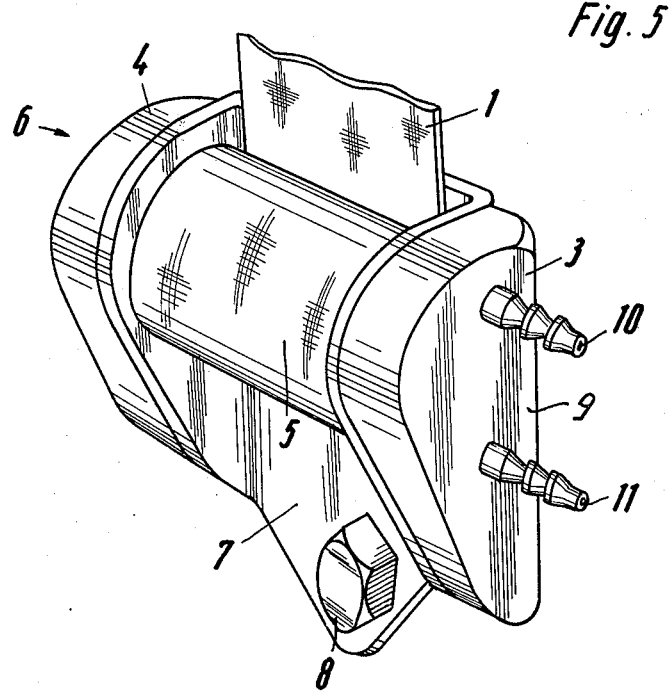

FIG. 5 is an isometric view of a pull-in device according to the invention.

FIG. 6 is a partial section through a pull-in device with a drive by a wing cell motor (Fluegelzellenmotor).

FIG. 7 shows a pull-in device with an electric drive.

FIG. 7a shows a basket armature arrangement.

FIG. 8 represents a further embodiment of the pull-in device according to the invention.

FIG. 8a is a section taken along the line VIIIa—VIIIa of FIG. 8.

Figure 9:
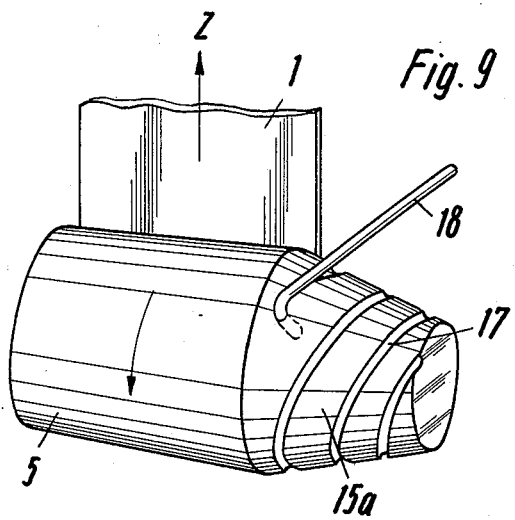

FIG. 9 illustrates the pull-in device according to FIG. 8 with left-hand thread.

Figure 10:
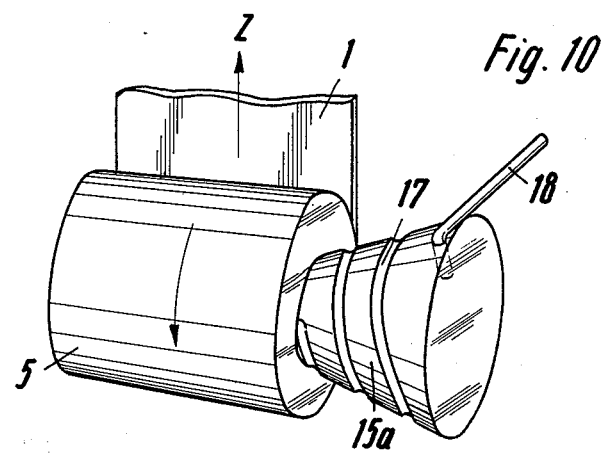

FIG. 10 shows the pull-in device according to FIG. 8 with a right-hand thread.

Figure 11:
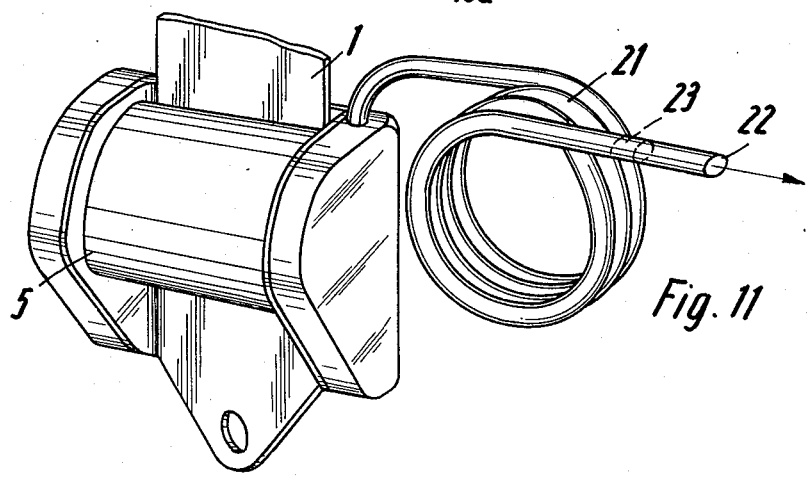

FIG. 11 represents still another embodiment of the pull-in device according to the present invention.

The safety belt pull-in device according to the present invention is characterized primarily in that the return torque acting upon the reel shaft is generated by gas and/or liquid pressure or by electromagnetic forces. Instead of the return spring, according to the invention a gas or liquid operable motor is connected to the reel shaft which motor generates the return torque. Also, an electromagnetically driven motor, preferably a motor designed for a short circuit lead, is suitable for this purpose. These motors generate a constant return torque over the entire belt withdrawing range so that only a slight increase in the belt withdrawing force occurs in comformity with the reduction of the effective lever arm. The gaseous liquid or electric energy required for such operation is available in motor vehicles.

According to a further development of the invention, the return torque is so selected that the withdrawing force of the belt from the reel shaft is approximately constant over the entire winding range.

Referring now to the drawings in detail, it will be evident from FIGS. 4 and 5 that the belt 1 is wound onto a reel shaft 2, the ends of which are journaled in a housing part 3 receiving the motor and in a housing 4 comprising a locking mechanism for the belt 1. The reel shaft 2 is so arranged between the two housings 3, 4 that the full reel or spool 5 does not project beyond the housing parts 3, 4. The two housings 3, 4 are interconnected by a web 7 by means of which the entire pull-in device 6 is, with the aid of screws 8 connected in the vehicle. For purposes of driving the motor arranged in housing 3, the outer wall 9 of housing 3 is provided with connections 10 and 11 for a pressure fluid by means of which the motor is driven.

With the embodiment of FIG. 6, as the motor for the pull-in device 6, there is provided a wing cell motor operable pneumatically or hydraulically. This motor has a rotor 12 which is eccentrically journaled in the housing 3 and on which there are arranged four radially displaceable wings 13 which extend at a right angle with regard to each other. The space between the housing 3 and the rotor 12 is divided by the wings 13 into individual cells, the volume of which changes during the rotation due to a radical change in the position of the wings 13. The individual cells are, during one revolution, connected once with the inlet 10 and once with the outlet 11. The motor can thus operate with underpressure and also with overpressure while the rotation of the rotor 12 is directly conveyed to the reel shaft of the pull-in device.

The motor for the pull-in device may also be driven electrically, for instance, by means of a vehicle battery (FIG. 7). In this instance, for instance a disc rotor motor (Scheibenlaeufermotor) is employed. This disc rotor motor has a rotor 14, as shown in FIG. 7, which is arranged on that end of the shaft 2 which is located in the motor housing 3. The rotor 14 consists of insulating material and rotates between magnets 15 which create a homogeneous magnetic field. Instead of the disc-shaped rotor motor, also a basket armature motor may be utilized in accordance with an illustration of FIG. 7a. A collector 14a is surrounded by carbon pins 24 (brushes) and the like and this structure is located at one end of shaft 2 in a motor housing. A basket armature 25 likewise located on shaft 2 fits into a circular-formed slot 26 of a magnet ring 27. The wing cell motor and the disc rotor motor have only small dimensions and therefore can easily be mounted in the vehicle as accessories.

Figure 1:
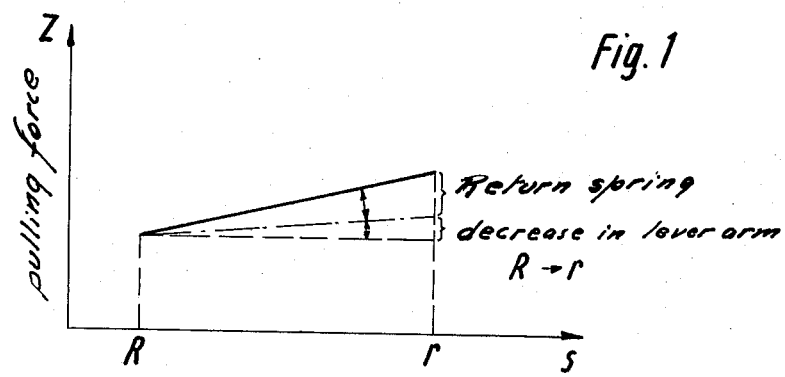
FIG. 1 represents a graph illustrating the course of the force required for the pulling out of the belt; plotted over the abscissa is the winding radius with a customary return spring, and plotted over the ordinate is the pulling force for pulling out the belt.
Figure 2:
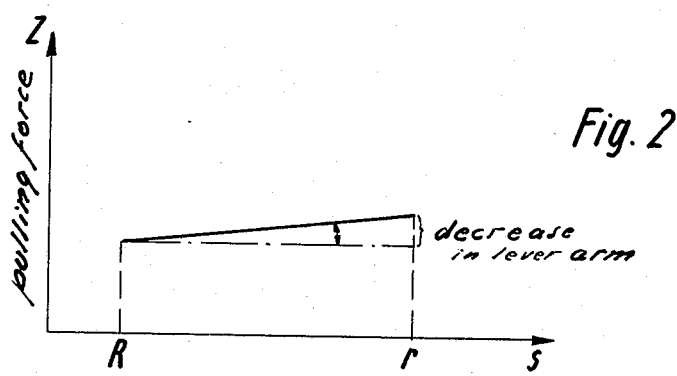
FIG. 2 represents a graphic illustration of the course of the force required for pulling out the safety belt over the winding radius with a device according to the invention for pulling in the belt at a substantially constant return torque.

The invention makes it possible to reduce to a minimum the increase in force when pulling out the belt 1. FIG. 1 shows a diagram in which the pulling force Z at which the belt 1 is wound off the reel 5 is plotted over the radius of the winding wheel with a customary return spring. When the belt 1 is wound on completely, the reel 5 has the radius R (FIG. 4). The heretofore customary spring is in this condition preloaded by a certain force. When winding off the belt 1, the return force greatly increases with decreasing radius of the reel 5 and at the radius $r$ at which the belt 1 has been wound off completely, reaches its maximum value (line drawn in full). This course of the force is brought about by the increase in the spring force and by the simultaneous decrease in the effective lever arm (dash line). With the embodiment according to FIG. 2, the increase in the return force will with a constant return torque be decreased with decreasing coil radius. In this way, only the decrease in the effective lever arm occurs during which the contribution of the spring force no longer occurs.

With the embodiment of the pull-in device 6 illustrated in FIGS. 8 and 8a, the free end section 15 of the reel shaft 2 has mounted and arrested thereon a truncated cone-shaped part 15a, the cone mantle 16 of the part 15a having thread-like grooves 17 for receiving a flexible pulling means 18. The radial pitch component of these grooves 17 is preferably of the same magnitude as the thickness of the safety belt. With a full winding reel 5, the pulling means 18 in the form of a cable or a cord is connected to the cone mantle 16 at an area of the largest diameter. The grooves 17 for the pullng means 18 are so arranged that the pulling means 18 will, when pulling out the belt 1, wind up upon the truncated cone-shaped part 15a and correspondingly will attack at the smaller diameter of the cone mantle. The core diameter of the truncated cone may be smaller than the diameter of the reel shaft 2. In order to prevent the pulling means 18 from dropping off the part 15a, between the part 15a and the housing part 3 there is maintained a distance $a$ which is less than the diameter of the pulling means 18. The pulling means 18 is at its free end connected to a piston 19 which is sealingly guided in a cylinder 20 which extends approximately perpendicularly for pulling out the belt 1. The cylinder 20 may be made separately from the motor housing 3 of the pulling device 6, but may also form one piece therewith. Piston 19 is acted upon by a subpressure or pressure below atmospheric. However, the piston 19 may also be acted upon by an overpressure or pressure above atmospheric. Inasmuch as the piston 19 is guided in the cylinder 20 in a sealing manner, it will be appreciated that at a pressure difference involving low overpressure or subpressure in cylinder 20 always the return torque required as to its proper size will be available for the belt 1. Advantageously, the lower pressure already present in the vehicle is employed so that no additional pressure medium is required. It is possible to design the thread-like grooves 17 as left or right-hand thread while the maximum diameter of the cone mantle in the first instance is located in spaced relationship to the free end 15 of the reel shaft 2 and in the second instance at the free end 15 of the reel shaft 2 (see FIGS. 9 and 10). In this way, the pulling means 18 can be connected on the truncated cone in conformity with the available space.

FIG. 11 shows an embodiment in which instead of the stretched out cylinder 20 there is provided a helically arrangeable connecting pipe 21, the free end of which is designed as the cylinder 22 having sealingly reciprocably arranged therein a piston 23. Piston 23 is likewise acted upon by pressure difference involving a subpressure or overpressure. The pull means 18 is guided by the connecting pipe 21 and is connected to the piston 23. This embodiment will, over the previous embodiment of the pull-in device, require only little space so that it can also be installed at narrow places in the vehicle.

By means of the pull-in device illustrated in FIGS. 8–11, it will be assured that over the entire winding range of the belt, the pull-off force remains approximately constant (FIG. 3). Since the force during the pulling out of the belt 1 does not increase any longer, it is necessary to increase the starting force by an amount Z relative to the embodiment described in FIGS. 4–7 in order to make sure that the belt can again be completely wound up. The force during the pulling-out operation will be maintained constant due to the fact that the diameter of the cone mantle 16 onto which the pulling means 18 is wound upon decreases in conformity with the decreasing radius of the winding reel 5. Inasmuch as the radial pitch component of grooves 17 is substantially of the same size as the thickness of the safety belt, a uniform movement of the piston 19, 20 will be assured in the cylinder 20, 22.

As will be evident from the above, the pull-in device for safety belts according to the invention brings about that the safety belt can be pulled out at a low increase in power, while it is assured that the belt will reel back completely into its starting position.

It will also be evident from the above that the pulling device has small dimensions so that it can be easily mounted in vehicles. Inasmuch as the driving means required for operating the motor of the pull-in devices are already there, the installation of the device in vehicles is simple and can be carried out inexpensively.

It is, of course, to be understood that the present invention is, by no means, limited to the specific showing in the drawings, but also comprises any modifications within the scope of the appended claims.

What I claim is:

1. A safety belt pull-in device, especially for land and air vehicles, which includes in combination: a rotatable reel comprising a shaft, safety belt means having one end connected to said reel, and being windable upon and off said reel, the other end of said belt means being connectable to a stationary belt, and motor means operatively connected to said reel for winding said belt means onto said reel and permitting a substantially constant unwinding of said belt means off said reel subject to avoiding self-binding during application of only at least approximately even force for permitting withdrawal of said safety belt means.

2. A safety belt pull-in device, especially for land and air vehicles, which includes: a rotatable reel comprising a shaft, safety belt means having one end connected to said reel, and being windable upon and off said reel, the other end of said belt means being connectable to a stationary belt, motor means operatively connected to said reel for winding said belt means onto said reel and permitting a winding of said belt means off said reel at at least approximately even force, said reel having a free end section in the form of a truncated cone provided with thread-like grooves, and flexible pull means forming part of said motor means and having one end connected thereto while its other end is connected to said truncated cone.

3. A device according to claim 2, in which said motor means is a fluid operable motor.

4. A device according to claim 2 in which said motor means is an electromagnetic motor.

5. A device according to claim 4, in which the radial pitch component of said grooves has a magnitude approximately equalling the thickness of said belt means.

6. A device according to claim 4, in which said pull means is so connected to said truncated cone that when the maximum portion of said belt means is wound upon said reel, said pull means is connected to the largest diameter groove of said truncated cone and the ascending sense of said grooves is such that said pull means is wound upon said truncated cone when said belt means is being wound off said reel and correspondingly engages the smaller diameter of said truncated cone.

7. A device according to claim 4, which includes housing means having said reel shaft journaled therein, and in which said truncated cone is spaced from said housing means by a distance less than the diameter of said pull means.

8. A device according to claim 4, which includes fluid operable cylinder-piston means, and in which said pull means is in the form of a cable having one end operatively connected to said cylinder-piston means and having its other end connected to said truncated cone.

9. A device according to claim 8, in which said fluid operable cylinder-piston means is operable by a subpressure.

10. A device according to claim 4, in which said motor means in an electric motor.

11. A device according to claim 4, in which said motor means is a short circuit motor with a disc rotor.

12. A device according to claim 4, in which said motor means is a short circuit motor with a basket armature.

13. A device according to claim 8, in which the cylinder of said cylinder-piston means is in the form of a coil.

14. A device according to claim 8, which includes housing means having said reel shaft journaled therein, and in which the cylinder of said cylinder-piston means is rigidly connected to said housing means.

15. A device according to claim 14, in which said cylinder of said cylinder-piston means forms a single integral piece with said housing means.

* * * * *